G. E. WEBBER.
Followers for Brine-Barrels.

No. 150,499. Patented May 5, 1874.

WITNESSES:
INVENTOR:
G. E. Webber
BY
ATTORNEYS.

UNITED STATES PATENT OFFICE.

GEORGE ENOCH WEBBER, OF HINCKLEY, OHIO.

IMPROVEMENT IN FOLLOWERS FOR BRINE-BARRELS.

Specification forming part of Letters Patent No. 150,499, dated May 5, 1874; application filed January 31, 1874.

*To all whom it may concern:*

Figure 1:
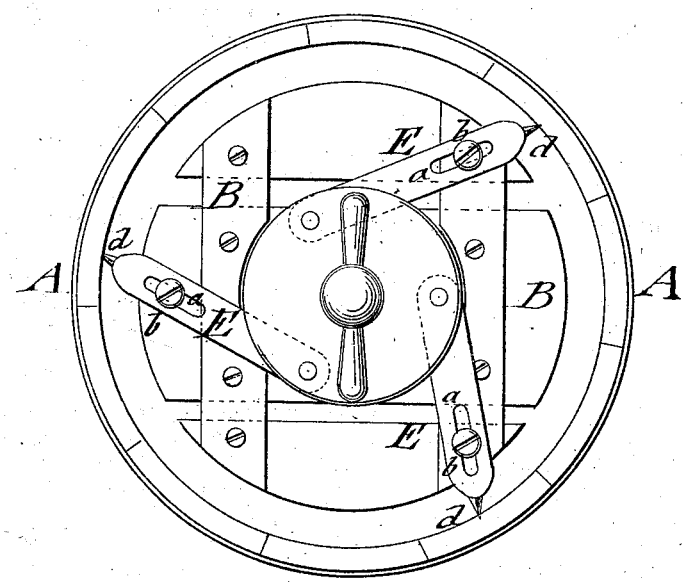
Figure 2:
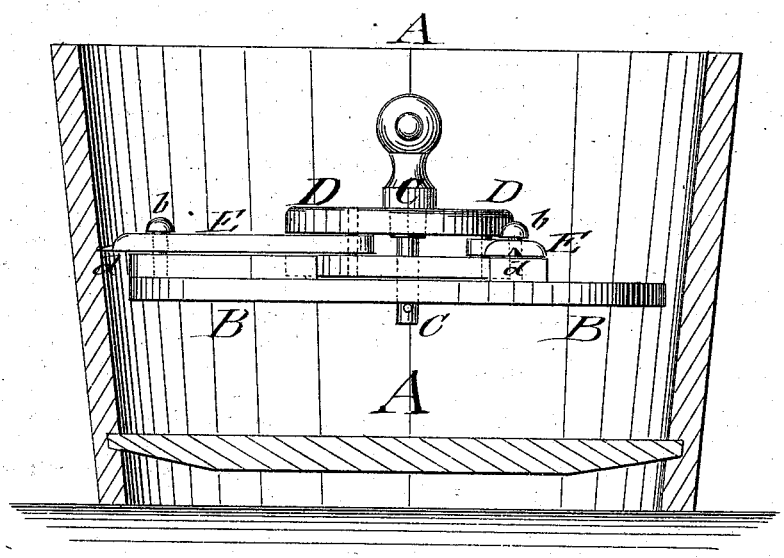

Be it known that I, GEORGE E. WEBBER, of Hinckley, in the county of Medina and State of Ohio, have invented a new and Improved Follower for Brine-Barrels, of which the following is a specification:

In the accompanying drawing, Figure 1 represents a top view, and Fig. 2 a side view, of my improved follower as applied to a barrel for keeping meat and other articles under brine.

Similar letters of reference indicate corresponding parts.

The object of my invention is to construct, for the purpose of holding meat, fish, vegetables, and other articles under brine, a follower which may be readily and securely adjusted in higher or lower position in the barrel, and forms thereby a very useful and convenient device for family and business purposes. My invention consists of a follower which is attached to the side of the barrel by slotted arms with spike ends, which arms are guided by suitable pins and carried forward and back by being pivoted with their inside ends to a collar applied to and turned by a central shaft of the follower.

A represents a barrel or tub, or any other vessel used for the purpose of preserving, under brine, meat, fish, vegetables, or other articles of domestic consumption. The follower B is placed on top of the article and pressed down upon it, being of such a diameter as to be easily adjusted along the whole length of the barrel. The follower B is provided with a central shaft, C, which may be turned by suitable handles applied to its head. A single or double collar, D, is firmly keyed to shaft C, and has two or more arms, E, pivoted at equal distances near the circumference of collar D. Arms E are guided by means of slots $a$, and provided at their outer ends with sharp spikes $d$, which are forced into the side walls of the barrel when the shaft is turned in either direction, as shown in Fig. 1.

The follower is thereby firmly retained in position, and serves to keep the meat or other article under brine as far as required, while it may at the same time be quickly and easily detached for the purpose of taking out any part required, and then replaced with equal facility, without loss of time and the inconvenience hitherto attending it.

Having thus described my invention, I claim as new and desire to secure by Letters Patent—

The combination, with the meat tub, keg, or barrel, follower B, having pins $b$, and its central shaft C, of the fixed collar D and the pivoted slotted spike-arms E $d$, all constructed and arranged substantially as and for the purpose specified.

GEORGE ENOCH WEBBER.

Witnesses:
FRANKLIN SWIFT,
MARIA R. SWIFT.